(12) United States Patent
Furuki et al.

(10) Patent No.: US 6,225,975 B1
(45) Date of Patent: *May 1, 2001

(54) CONTROL DEVICE FOR GAME MACHINE

(75) Inventors: Shigeru Furuki; Atsushi Masuda; Tomokuni Wauke; Takahiro Kawauchi, all of Iwaki (JP)

(73) Assignee: Alps Electric Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/041,363

(22) Filed: Mar. 9, 1998

(30) Foreign Application Priority Data

Mar. 18, 1997 (JP) .................................................. 9-064543

(51) Int. Cl.$^7$ ...................................................... G09G 5/00
(52) U.S. Cl. .......................... 345/156; 345/161; 345/163; 273/148; 273/239; 463/36; 463/37
(58) Field of Search ................................... 345/156, 157, 345/161, 163, 110, 111, 184; 273/148, 239; 463/36, 37

(56) References Cited

U.S. PATENT DOCUMENTS

| | | | |
|---|---|---|---|
| 4,853,630 | * | 8/1989 | Houston ................................ 324/208 |
| 5,576,583 | * | 11/1996 | Umehara ................................ 310/13 |
| 5,666,138 | * | 9/1997 | Culver ................................... 345/161 |
| 5,691,898 | * | 11/1997 | Rosenberg et al. ................... 364/190 |
| 5,692,956 | * | 12/1997 | Rifkin .................................... 463/37 |
| 5,784,052 | * | 7/1998 | Keyson ................................. 345/167 |
| 5,953,105 | * | 9/1999 | Van Engelen et al. ................. 27/42 |
| 5,999,168 | * | 12/1999 | Rosenberg et al. ................... 345/161 |
| 6,030,291 | * | 2/2000 | Maki et al. ............................ 463/38 |

FOREIGN PATENT DOCUMENTS 4-13860   3/1992 (JP) .

* cited by examiner

Primary Examiner—Richard Hjerpe
Assistant Examiner—Henry N. Tran
(74) Attorney, Agent, or Firm—Brinks Hofer Gilson & Lione

(57) ABSTRACT

A vibration device with a simple structure, in which a yoke and a coil are combined, is incorporated in a game machine control device, and caused to vibrate in response to displays on the screen of a game machine. This structure allows vibrations to be transmitted to a player who is gripping the control device, and therefore, the player can be given the effect of the sense of touch in compliance with the displays.

9 Claims, 2 Drawing Sheets

CONTROL DEVICE FOR GAME MACHINE

BACKGROUND OF THE INVENTION

1. Field of the Invention

The present invention relates to a control device to be used for a game machine, and more particularly, to a control device for a game machine that is used as a controller of a video game machine.

2. Description of the Related Art

Game machine control devices generally include a controller of a TV game machine for home use, a control or handling device of a large video game machine for use in an amusement center, and the like.

The conventional control device of this type is principally used for appropriate input according to the development of scenes displayed on the screen of a game machine. With sophistication of the contents of games, the number of switches provided in the control device has increased, and, for a good command of these switches, improvements have been made to the shape of the control device and the arrangement of the switches.

The recent sophistication of games has included an increasing demand for a game machine that adds to the realism by allowing an operator thereof (hereinafter referred to as a "player") to realize the contents of a game through bodily sensation. Particularly, in a game including action scenes, it is expected that the realism of the game will be enhanced by transmitting more realistically the feeling of impact of an action, such as a collision in a car race or an attack from an opponent in a fighting scene, to the player.

SUMMARY OF THE INVENTION

Accordingly, it is an object of the present invention to provide a game machine control device that vibrates in response to displays on the screen of a game machine in order to add more realism to a game.

According to the main aspect of the present invention, there is provided a game machine control device having a built-in vibration device that forms a magnetic circuit between a coil and a yoke and causes the yoke or the coil to vibrate by passing current through the coil.

In the game machine control device, it is preferable that the coil be fixed on a support member, and the yoke having a magnet located therein be fixed on the support member via an elastic member and caused to vibrate.

It is preferable that the yoke be fixed on a support member, and the coil be fixed on the support member via an elastic member and caused to vibrate.

Preferably, the vibration device is incorporated in an arm section of the control device.

DESCRIPTION OF THE PREFERRED EMBODIMENT

A game machine control device according to an embodiment of the present invention will be described below with reference to FIGS. 1 and 2.

Figure 1:
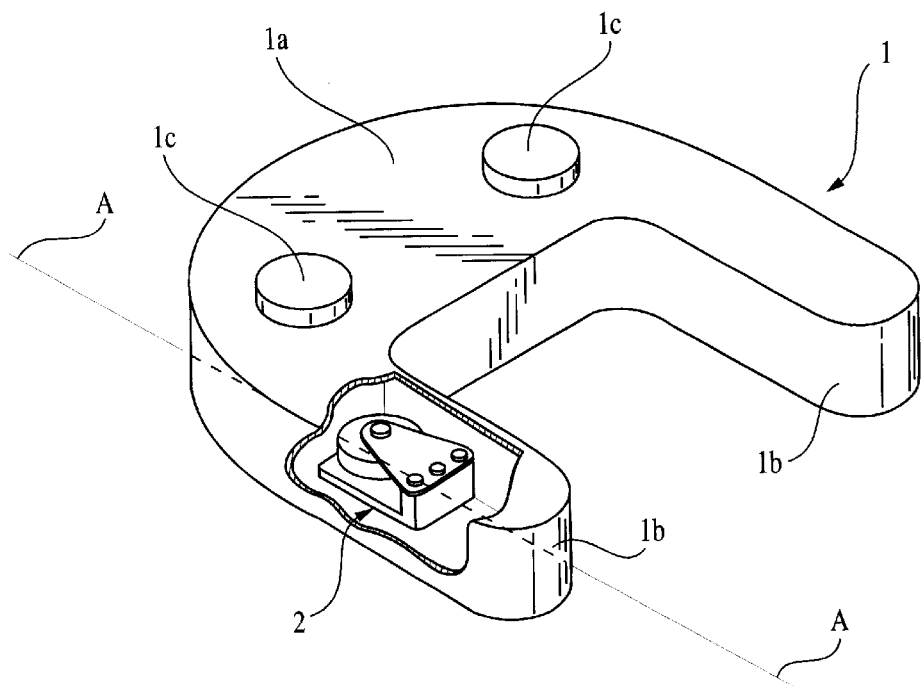
FIG. 1 is a partly cutaway perspective view of a game machine control device according to an embodiment of the present invention.

FIG. 1 is a partly cutaway perspective view of a game machine control device according to the embodiment of the present invention. The control device is generally shaped like a steering wheel of an automobile, a handlebar of a motorcycle, or a control stick of an airplane, and in this embodiment, the control device is shaped like a handlebar of a motorcycle as an example.

A player of a game machine plays a game while gripping arm sections 1b that project from both sides of a main body 1a of a control device 1 for the game machine. The main body 1a is provided with various control switches 1c. The player grips the arm sections 1b, appropriately turns these switches 1c on and off by the fingers, and turns the control device 1 laterally through a moderate angle, thereby controlling the game machine.

A vibration device 2 is fixed by screws or the like (not shown) inside each arm section 1b of the control device 1. Electric signals are input to the vibration device 2 at the appropriate time in accordance with development of displays on the screen of the game machine, and the vibration device 2 is thereby caused to vibrate. The vibration is transmitted to the arm section 1b, and the arm section 1b is thereby caused to vibrate. Then, the vibration of the arm section 1b is transmitted to the player who is gripping the arm section 1b, which further enhances the realism given to the player from displays on the screen and sound effects.

Although FIG. 1 illustrates only one vibration device 2, the number of vibration devices is not especially limited to one, and a plurality of vibration devices may be incorporated into the control device 1 in accordance with the game contents and the taste of players. It is preferable that both the arm sections 1b be provided with the vibration device 2 fixed inside thereof because a strong vibration is transmitted to the player before being significantly damped. Furthermore, it is preferable that the vibration devices 2 be fixed at positions in the arm sections 1b corresponding to the palms of the hand of the player gripping the arm sections 1b because a strong impact is reliably transmitted to the player.

Figure 2:
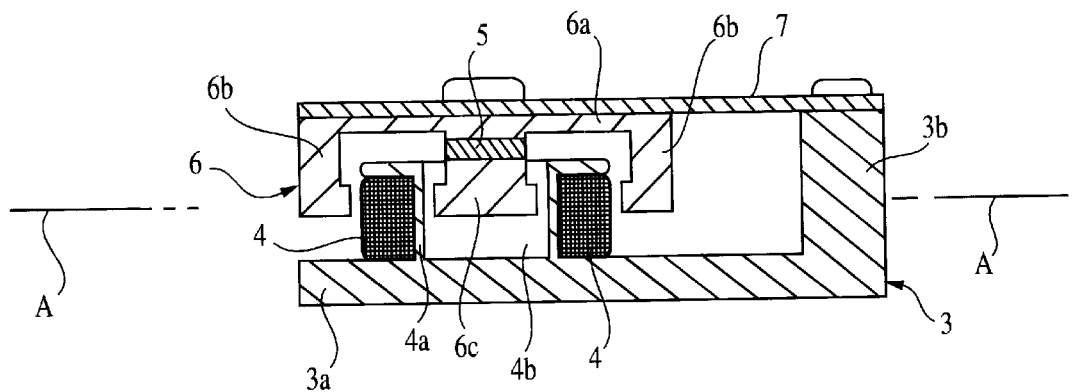
FIG. 2 is a schematic sectional view taken along line A—A of FIG. 1 of a vibration device provided in the control device of the embodiment of the present invention.
Figure 3:
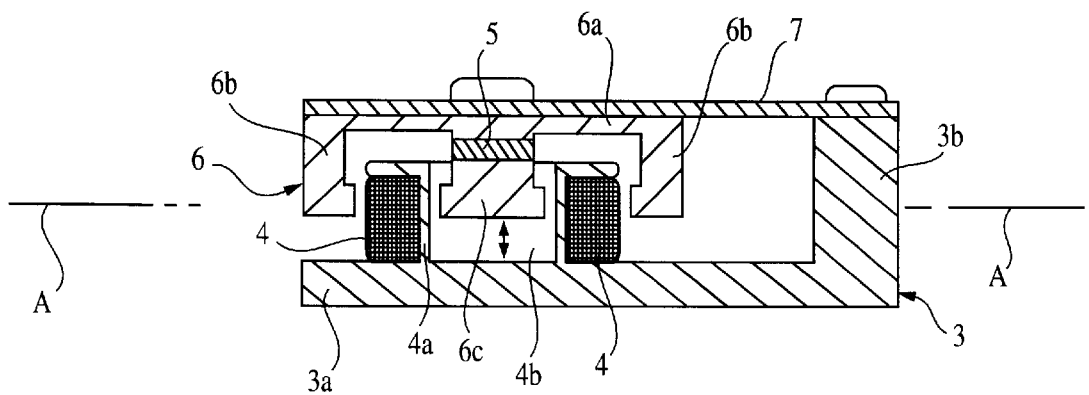
FIG. 3 is a schematic sectional view taken along line A—A of FIG. 1 of a vibration device provided within the control device of the embodiment of the present invention.

FIG. 2 is a schematic sectional view of the vibration device 2 according to the embodiment of the present invention. In regard to the structure of the vibration device 2, a support member 3, which is made of a non-magnetic block of ABS resin or the like and has an L-shaped cross-section, is composed of a base section 3a and a column section 3b, and a cylindrical coil 4 is fixed on a flat surface of the base section 3a. In this case, a cylindrical core section 4a made of a non-magnetic material, such as ABS resin, and having the coil 4 wound thereon may be bonded to the base section 3a by an adhesive, or the cylindrical coil 4 may be formed by winding a conducting wire around the core section 4a that is integrally formed with the flat surface of the base section 3a.

Next, a yoke 6 with a magnet 5 therein is formed. The yoke 6 is shaped like a covered cylinder that spreads over the outer periphery of the cylindrical coil 4, and includes a circular cover section 6a, a ring-shaped side wall section 6b projecting from the rim of the cover section 6a, and a projecting section 6c located inside the side wall section 6b and projecting from the center of the cover section 6a. The magnet 5 is embedded between the leading end of the projecting section 6c and the cover section 6a.

The projecting section 6c and the side wall section 6b are located close and opposed to each other at the leading ends thereof. As a result, a magnetic circuit, which starts from the leading end of the projecting section 6c and returns to the projecting section 6c via the side wall section 6b and the cover section 6a, is formed by the magnet 5 in the yoke 6. The magnet 5 is made of Nd—Fe—B or the like that has strong magnetic force, and the yoke 6 is made of a magnetic metal mainly consisting of iron.

Then, one end of an elastic member 7 is fixed on the upper surface of the cover section 6a of the yoke 6, and the other end is fixed to the end of the column section 3b of the support member 3, thereby coupling the yoke 6 and the support member 3. Finally, the projecting section 6c of the yoke 6 is partially inserted into a hollow section 4b of the coil 4, and the yoke 6 is put on the coil 4 so that the side wall section 6b of the yoke 6 partially covers the outer peripheral surface of the coil 4, whereby the coil 4 and the side wall section 6b are placed opposed to each other. In this embodiment, the elastic member 7 is formed of a leaf spring of stainless steel, or a plate member of hard rubber or plastic, and fixed to the yoke 6 and the support member 3 by welding, bonding, or screwing depending on the material thereof.

The mechanism of vibration of the vibration device 2 having the above structure will now be described. When square-wave current is passed through the coil 4 at a predetermined frequency, the yoke 6 is caused to move vertically relative to the coil 4 by an electromagnetic action resulting from the switching between the current passage directions. Since the yoke 6 is fixedly coupled to the support member 3, on which the coil 4 is fixed, via the elastic member 7, if the support member 3 is fixed on the control device 1, the yoke 6 having a relatively heavy mass moves vertically relative to the coil 4 to a degree that it does not hit the base section 3a of the support member 3. The vertical movements are transmitted as vibrations to the support member 3 via the elastic member 7, and the vibrations are transmitted to the arm section 1b of the control device 1, and then, effectively transmitted to the player. Since the yoke 6 does not hit the base section 3a, the insides of the arm sections 1b and the main body 1a are prevented from being contaminated by chips of the base section 3a shaved owing to the hitting, and an electrical malfunction resulting from the contamination can be avoided.

In the vibration device 2 thus structured, since the side wall section 6b encircles the periphery of the projecting section 6c with a constant spacing between the inner surface thereof and the projecting section 6c along the entire circumference thereof, it has a wide area opposed to the projecting section 6c via the coil 4 and can absorb a great amount of magnetic flux of the magnet 5 passing through the coil 4, which makes it possible to reduce the size of the yoke 6. Furthermore, since the force to move the yoke 6 in the vertical direction is expressed as the product of the magnetic flux density and the strength of current, it is possible to move the yoke 6 vertically by passing a weak current through the coil 4, and to thereby reduce the power consumption of the coil 4. In addition, since the magnet 5 may be a cheap one that has a relatively low magnetic flux density, it is possible to reduce the manufacturing cost of the vibration device 2.

While the coil 4 is fixed on the support member 3 and the yoke 6 is fixed on the elastic member 7 in the vibration device 2 of the embodiment mentioned above, the yoke 6 and the coil 4 may, conversely, be fixed on the support member 3 and the elastic member 7, respectively. In this case, the coil 4 moves vertically relative to the yoke 6 through the passage of square-wave current therethrough.

In the vibration device 2 of this embodiment, the vertical movement of the yoke 6 is transmitted as vibrations to the support member 3 via the elastic member 7 so that the yoke 6 does not hit the base section 3a of the support member 3 in order to prevent contamination of the insides of the arm section 1b and the main body 1a. The yoke 6 that moves vertically relative to the coil 4 may hit the base section 3a of the support member 3. In this case, it is preferable that the base section 3a be made of a hard material or an elastic member, such as rubber, be fixed on at least either the yoke 6 or the base section 3a, at a position where the yoke 6 hits the base section 3a. Since the yoke 6 can directly transmit vibrations to the base section 3a with shaving of the base section 3a being prevented, vibrations can be produced that are greater than those in the case in which the elastic member 7 intervenes between the yoke 6 and the base section 3a.

When the coil 4 moves vertically relative to the yoke 6 fixed on the support member 3, it is preferable that the base section 3a be made of a hard material or an elastic member, such as rubber, be fixed on at least either the coil 4 or the base section 3a, at a position where the coil 4 hits the base section 3a. In this case, the coil 4 can directly transmit vibrations to the base section 3a with shaving of the base section 3a being prevented, and therefore, vibrations can be produced that are greater than those in the case in which the elastic member 7 intervenes between the coil 4 and the base section 3a.

At this time, since the mass of the yoke 6 is larger than that of the coil 4, it is preferred, for greater vibrations, to cause the yoke 6 to hit against the base section 3a rather than to cause the coil 4 to hit.

Furthermore, the amplitude or number of vibrations can be changed by changing the strength or frequency of the square-wave current to be passed through the coil 4. For example, more realism can be given to the player by changing the amplitude or number of vibrations according to the game contents, or with the passage of time.

As mentioned above, the game machine control device according to the present invention incorporates a vibration device therein, and is caused to vibrate by the vibration of the vibration device in response to the development of displays on the screen of the game machine. Since vibrations are thereby given to the player who is holding the control device, a feeling that appeals to the sense of touch is added by the control device of the invention to the realism obtained previously that appeals to the senses of sight and hearing, and therefore, the quality of realism given from the game machine can be substantially enhanced.

Furthermore, since the vibration device has a simple structure in which a coil and a yoke are combined, it is possible to manufacture the game machine control device of the present invention at low cost.

Still furthermore, since the amplitude or number of vibrations of the vibration device can be changed by changing only the strength or frequency of a square-wave current to be input, it is possible to easily obtain various types of vibrations.

In addition, since the vibration device is incorporated in an arm section, vibrations are transmitted to the arm section without damping, which can give strong vibrations to the player who is gripping the arm section.

While the present invention has been described with respect to what is presently considered to be the preferred embodiment, it is to be understood that the invention is not limited to the disclosed embodiment. The present invention is intended to cover various modifications and equivalent arrangements included within the spirit and scope of the appended claims.

What is claimed is:

1. A game machine control device having a vibration device, comprising:
   a coil;
   a yoke movably coupled along a vertical path to said coil;
   a magnetic device electrically coupled to said coil and mechanically coupled to said yoke; and
   an elastic member mechanically coupled to said yoke; wherein movement of said yoke along said vertical path relative to said coil generates a vibration.

2. A game machine control device according to claim 1, wherein said coil is mechanically coupled to a support member, and said yoke is mechanically coupled to said support member via said elastic member.

3. A game machine control device according to claim 1, wherein said yoke is fixed on a support member, and said coil is fixed on said support member via said elastic member.

4. A game machine control device according to claim 1, wherein said vibration device is incorporated in an arm section of said control device.

5. A game machine device having a vibration device, comprising:
   a coil;
   a yoke movably coupled along a vertical path to said coil;
   a magnetic device electrically coupled to said coil;
   an elastic member mechanically coupled to said yoke; and
   a support member mechanically coupled to said elastic member, wherein movement of said yoke along said vertical path relative to said coil generates a vibration.

6. A game machine control device according to claim 5, wherein said coil is mechanically coupled to said support member within an arm section, and said yoke is mechanically coupled to said elastic member coupled to said support member at a column section.

7. A game machine control device according to claim 5, wherein said yoke is fixed on said support member of an arm section, and said coil is fixed to said elastic member coupled to said support member at a column section.

8. A game machine control device according to claim 5, further comprising an arm section enclosing said vibration device, wherein said vibration device comprises a plurality of vibration devices and said arm section comprises a plurality of arm sections that enclose at least one of said vibration devices.

9. A game machine control device, comprising:
   an arm section; and
   a vibration device enclosed within said arm section, the vibration device comprising:
   a coil;
   a yoke movably coupled along a vertical path to said coil;
   an elastic member mechanically coupled to said yoke; and
   a magnetic device electrically coupled to said coil and mechanically coupled to said yoke; wherein movement of said yoke along said vertical path relative to said coil generates a vibration.

\* \* \* \* \*